United States Patent
Bartholf et al.

(10) Patent No.: US 7,656,292 B2
(45) Date of Patent: Feb. 2, 2010

(54) FLEXIBLE ANTI-THEFT PACK FOR TRACKING AND LOCATION

(75) Inventors: Joel Bartholf, Macon, GA (US); Mitch Ingle, Macon, GA (US); Roger Hayward, Long Beach, CA (US); Konstantin Gromov, Pasadena, CA (US)

(73) Assignee: 3SI Security Systems, Inc., Exton, PA (US)

( * ) Notice: Subject to any disclaimer, the term of this patent is extended or adjusted under 35 U.S.C. 154(b) by 401 days.

(21) Appl. No.: 11/707,531

(22) Filed: Feb. 16, 2007

(65) Prior Publication Data

US 2008/0198002 A1  Aug. 21, 2008

(51) Int. Cl.
*G08B 13/14* (2006.01)

(52) U.S. Cl. .............................. 340/539.13; 340/568.1; 340/568.7; 340/571; 340/825.49; 109/2; 109/15

(58) Field of Classification Search ............ 340/539.13, 340/568.7, 825.49, 573.1, 573.4, 568.1, 825.37, 340/572.8, 572.1, 571, 572.7, 572.9; 701/23; 342/357.1, 357.07, 357.03, 357.06, 458; 455/456, 404, 517; 235/375; 379/155; 109/2, 109/15, 31, 38

See application file for complete search history.

(56) References Cited

U.S. PATENT DOCUMENTS

| | | | |
|---|---|---|---|
| 3,564,525 A | 2/1971 | Roeson et al. | |
| 3,828,341 A | 8/1974 | Carter, Jr. et al. | |
| 4,021,807 A | 5/1977 | Culpepper et al. | |
| 4,975,680 A | 12/1990 | Fogle, Jr. | |
| 5,059,949 A * | 10/1991 | Caparoni et al. | 340/571 |
| 5,196,828 A * | 3/1993 | Keniston | 340/568.7 |
| 5,448,223 A | 9/1995 | Johnson | |
| 5,485,143 A | 1/1996 | Keniston | |
| 5,515,032 A | 5/1996 | Johnson | |
| 5,838,237 A | 11/1998 | Revell et al. | |
| 5,952,920 A | 9/1999 | Braddick | |
| 6,121,922 A | 9/2000 | Mohan | |
| 6,249,245 B1 | 6/2001 | Watters et al. | |
| 6,552,660 B1 | 4/2003 | Lisowskl | |
| 6,801,129 B2 * | 10/2004 | Grimm | 340/568.7 |

* cited by examiner

*Primary Examiner*—Toan N Pham
(74) *Attorney, Agent, or Firm*—RatnerPrestia (57) ABSTRACT

A flexible security device for tracking and location. The device comprises a flexible housing having a hollow medial region. A location tracking assembly is contained, at least in part, within the hollow region. The location tracking assembly comprises a plurality of modules, including a wireless communications antenna module, a wireless communications electronics module, a global positioning system antenna module, a global positioning system electronics module, and a power module. A plurality of interconnects are configured among the plurality of modules, with one or more of the interconnects having sufficient flexibility to permit relative movement of at least one module relative to an adjacent interconnected module.

26 Claims, 4 Drawing Sheets

FLEXIBLE ANTI-THEFT PACK FOR TRACKING AND LOCATION

FIELD OF THE INVENTION

The present invention relates to an anti-theft pack for tracking and location of objects, ideally for use in currency anti-theft applications.

BACKGROUND OF THE INVENTION

Currency anti-theft devices, in the form of, for example, dye packs, alarm packs, or tracking packs, are used by the banking industry, financial institutions, and retail markets to facilitate detection and deterrence of theft and to assist in the apprehension of criminals. Dye packs typically release smoke or dye to stain the currency, which draws attention to the robber, renders the currency useless, and creates evidence of the theft. Dye packs may also contain tear gas to disorient the robber and aid apprehension. Various U.S. patents describe the design of such dye packs, including designs optimized to mimic the look and feel of a regular stack of currency. For example, U.S. Pat. No. 5,059,949 to Caparoni et al., owned by the assignee of the present invention, discloses a design with features that enhance the flexibility of the pack.

Other currency anti-theft devices have been designed for the purpose of tracking. For example, U.S. Pat. No. 4,021,807 to Culpepper et al., incorporated herein by reference, discloses a system in which a radio frequency transmitter is hidden within a packet of currency. U.S. Pat. No. 5,838,237 to Revell et al., incorporated herein by reference, discloses a personal alarm device in which a controller controls a transmitter and receiver to receive position location signals, such as Global Positioning System signals (GPS), establishes a cellular connection with a remote site, and transmits device location data to the remote site on the cellular connection. Other systems for interworking GPS and cellular phone technology for location and tracking devices are also well-known in the art, as described in U.S. Pat. No. 6,121,922 to Mohan and U.S. Pat. No. 6,249,245 to Watters et al., both incorporated by reference, as well as systems specifically for use in currency anti-theft devices, as described in U.S. Pat. No. 6,801,129 to Grimm, also incorporated herein by reference.

The existing art does not offer the realism that is required to adequately disguise tracking and recovery devices in a currency pack, however, so there is still a need in the art for a currency anti-theft device with tracking capability, having flexibility sufficient to simulate a genuine stack of currency to reduce the likelihood that a robber will be able to distinguish the anti-theft device from a real pack of currency.

SUMMARY OF THE INVENTION

One aspect of the invention comprises a flexible security device for tracking and location. The device comprises a flexible housing having a hollow medial region. A location tracking assembly is contained, at least in part, within the hollow region. The location tracking assembly comprises a plurality of modules, including a wireless communications antenna module, a wireless communications electronics module, a global positioning system antenna module, a global positioning system electronics module, and a power module. A plurality of interconnects is configured among the plurality of modules. One or more of the interconnects has sufficient flexibility to permit relative movement of at least one module relative to an adjacent interconnected module.

Another aspect of the invention comprises a method of tracking and location of objects, the method comprising providing the flexible security device as described above and causing it to be taken along with objects intended to be tracked. The device is activated to retrieve global positioning system coordinates of the device and to establish wireless communications between the device and a receiver for the wireless communications. The device transmits coordinates of the device via the wireless communications to the receiver to allow tracking and location of the objects.

Yet another aspect of the invention comprises a flexible security device for tracking and locating currency, the device comprising a housing simulating a stack of bills of currency, the stack comprising a plurality of individual sheets of genuine currency having an outer edge, the individual sheets bound together with an elastic cord adjacent to but sufficiently spaced from the outer edges to permit riffling of the outer edges at opposite ends of the housing. The stack comprises a hollow medial region in which a location tracking assembly is housed, at least in part. The location tracking assembly comprises a plurality of modules including a wireless communications antenna module comprising a flat periphery that extends beyond the medial region into a space between individual bills of the housing, a wireless communications electronics module, a global positioning system antenna module, a global positioning system electronics module, and a power module. A plurality of interconnects is configured among the plurality of modules, at least two of the interconnects having sufficient flexibility to permit relative movement of adjacent interconnected modules relative to one another, allowing the tracking assembly to be flexed into an S shape. A first flexible sheet is positioned adjacent a top side of the housing as a top cover for the hollow medial region, and a second flexible sheet is positioned adjacent a bottom side of the housing as a bottom cover for the hollow region. The top cover and the bottom cover each are secured to the housing. One or more cushioning elements is positioned between the top cover and the location tracking assembly, and one or more cushioning elements is positioned between the location tracking assembly and the bottom cover.

Still another aspect of the invention comprises a method for tracking and location of currency, the method comprising the steps of providing the flexible security device for tracking and locating currency as described above, positioning the flexible security device between two sheets of genuine currency, and causing the flexible security device to be taken along with other currency desired to be tracked. The location tracking assembly is activated to retrieve global positioning system coordinates of the device and to establish wireless communications between the device and a receiver for the wireless communications. The coordinates of the device are transmitted to the receiver via wireless communications.

Yet another aspect of the invention comprises a flexible security device for tracking and location, the device comprising a flexible housing having a hollow medial region and a location tracking assembly housed, at least in part, within the hollow medial region. The location tracking assembly comprises a plurality of substrates or substrate portions separated by interconnects between each set of adjacent substrates or substrate portions. One or more of the interconnects comprise flexible interconnects having sufficient flexibility to permit relative movement of at least one substrate or substrate portion relative to an adjacent interconnected substrate or substrate portion. The location tracking assembly comprises wireless communications means for conducting wireless communications between the assembly and a wireless communications receiver; positioning means for retrieving geographic location information about the device; power means for powering the wireless communications means and the positioning means; and control means for controlling the wireless communications means and the positioning means to transmit position information about the device by wireless communications to the wireless communications receiver.

DETAILED DESCRIPTION OF THE PREFERRED EMBODIMENT

Figure 1:
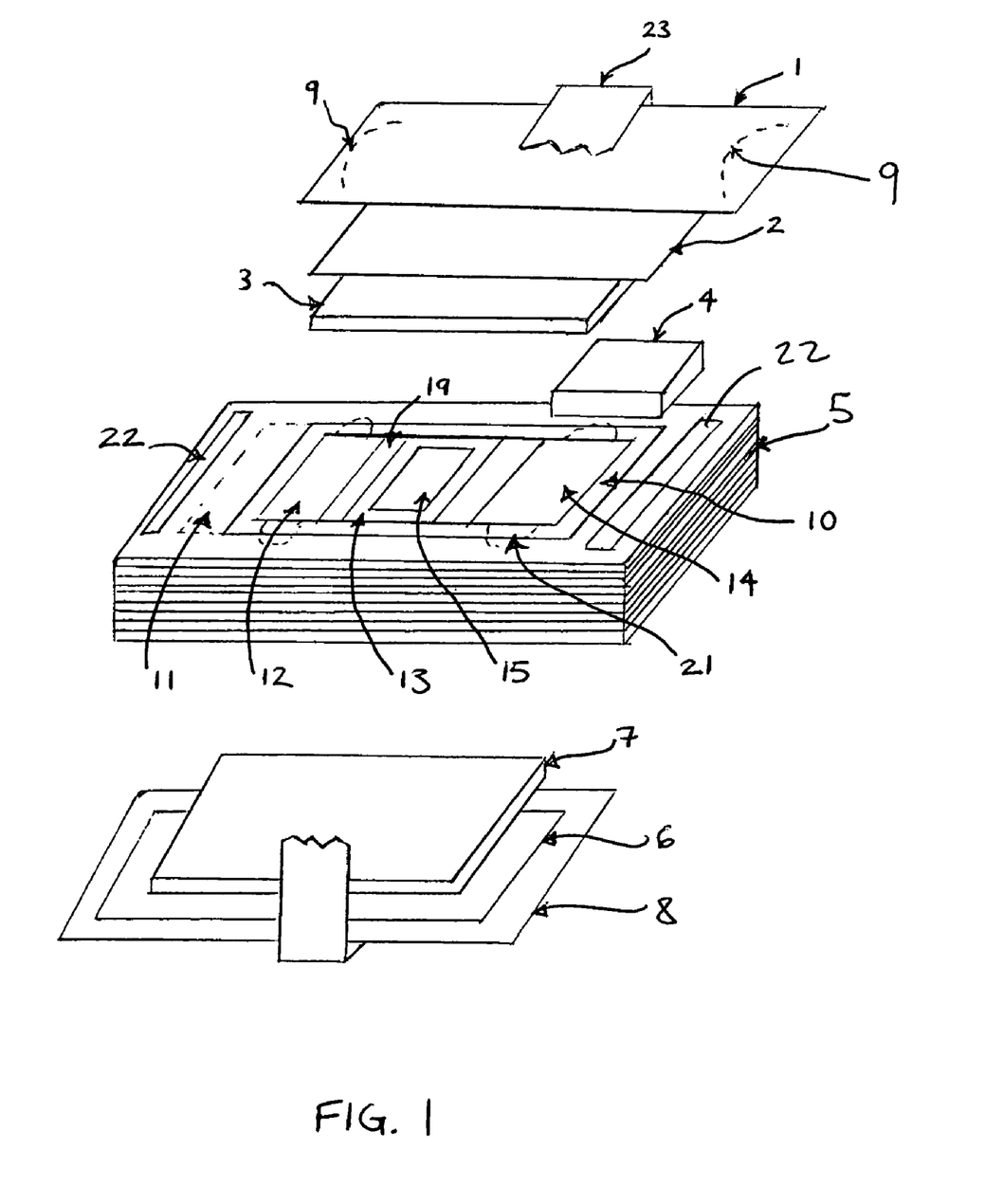
FIG. 1 is an exploded perspective view of an exemplary currency anti-theft pack.

Referring to the drawings, wherein like reference numerals refer to like elements throughout, FIG. 1 shows an exploded perspective view of an exemplary currency anti-theft pack layout, showing its major components. The location tracking assembly 10 is typically configured within a housing 5 comprising a stack of individual sheets, such as, for example, genuine currency bills, having a hollow cutout, preferably in the center, formed by removing portion of each of the bills. The bills are held together by a pair of lacing threads 9, such as an elastic cord, which is passed through small holes located near the outer edge of the bills, but far enough from the edge to provide a realistic feel when "riffling" the edges of the bill pack.

Flexible top and bottom cover sheets, 2 and 6 respectively, which may for example, comprise a thin plastic such as but not limited to polyethylene, may be secured to the housing and positioned adjacent a top side and adjacent a bottom side of the location tracking assembly 10 to retain the location tracking assembly 10 within the housing. The flexible cover sheets may be affixed to the currency bills, such as with lacing threads 9 or tape (not shown). In one embodiment, one end of the top cover sheet is affixed to the currency bills while the other, free end remains unrestrained to allow access to the components of the location tracking assembly 10. This free end may be held in place by positioning it under the lacing thread. In an alternative embodiment, both ends may be secured by positioning them under lacing threads, with neither end actually bound into the housing. Top and bottom cushioning elements 3 and 7 respectively, which may be, for example, polyethylene foam or polyurethane foam sheets, are positioned between the location tracking assembly 10 and the cover sheets 2 and 6, respectively. In a preferred embodiment, each of the cushioning elements has at least one face that has a smooth surface, which is positioned adjacent to the tracking assembly to promote sliding for improved flexibility. Additional cushioning, such as filler foam 4, may be used to further disguise the contents of the location tracking assembly 10, helping to provide a more realistic compliant feel to the currency anti-theft pack.

In use, one or more genuine currency bills, 1 and 8, are positioned on either side of the housing 5 to conceal the location tracking assembly 10 and to give a realistic appearance to the currency anti-theft pack. The currency bills may be attached to the laced bill pack assembly using one or more small pieces of double sided tape 22, for example. The completed currency pack may be wrapped with a standard bank money strap 23 to add mechanical stability and to further enhance the realistic appearance of the currency anti-theft pack.

The foregoing description, which is consistent with the housing and cover features of the currency anti-theft pack shown and described in U.S. Pat. No. 5,059,949 to Caparoni, incorporated herein by reference, is but one configuration for providing a flexible housing. The invention is not limited to any particular housing configuration, however, nor even limited to a housing that resembles a stack of currency. What is important is that the housing provide an overall compliant feel that does not betray the contents inside. Thus, other applications where a flexible tracking device is required may also benefit from the flexibility of the tracking and location assembly described below inside a flexible housing.

Figure 2:
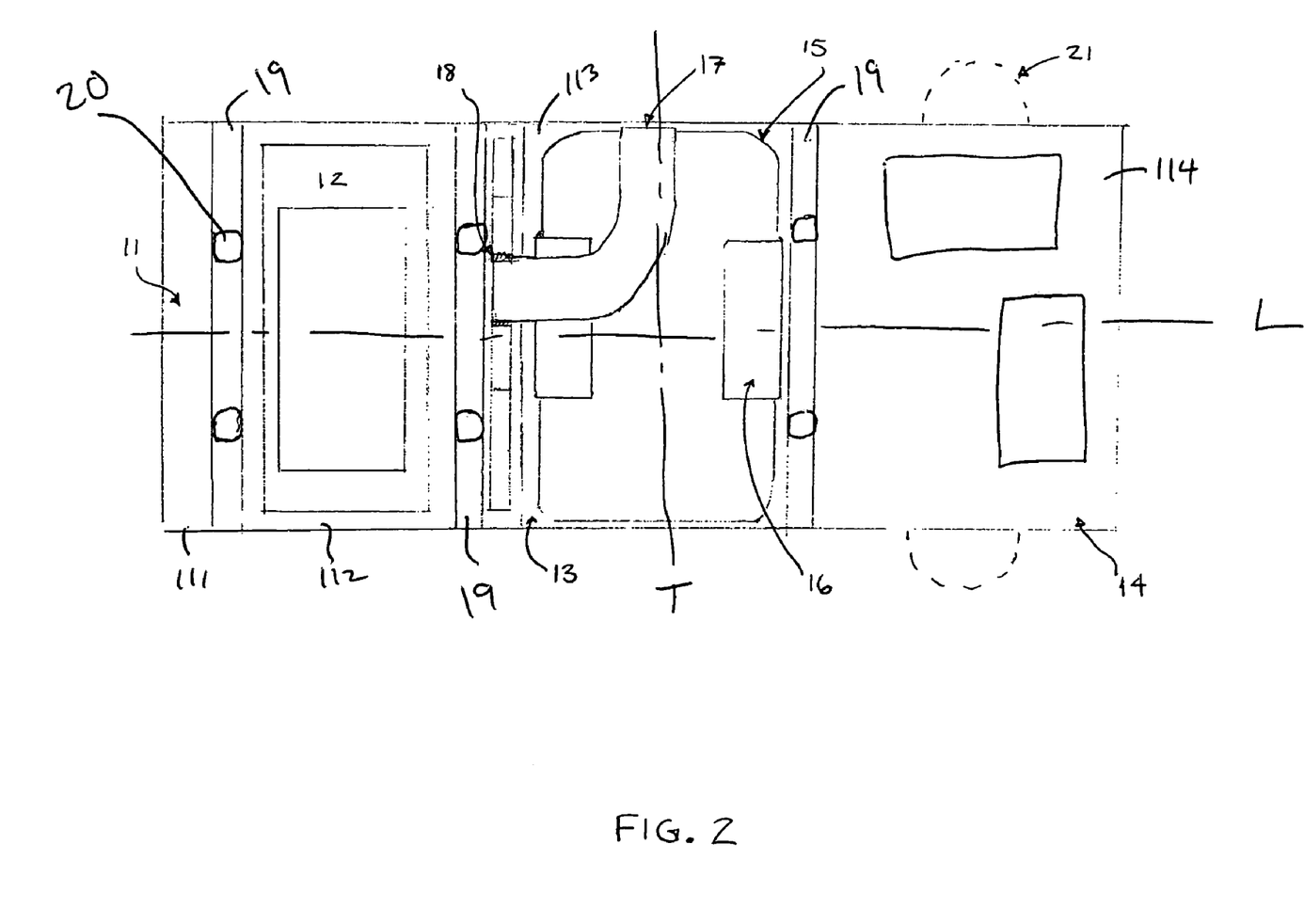
FIG. 2 is a top view of an exemplary location tracking assembly of the currency anti-theft pack of FIG. 1.
Figure 3:
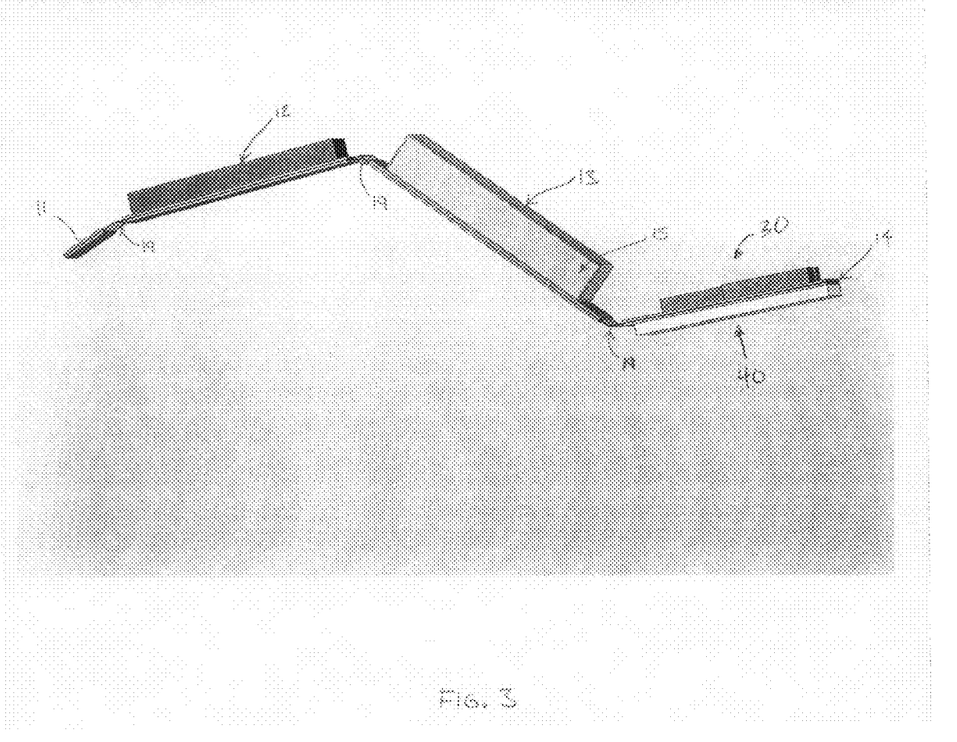
FIG. 3 is perspective side view of the exemplary location tracking assembly of FIG. 2.

Inside the housing is located a flexible tracking and location assembly 10. The embodiments shown in the figures have three flexible interconnection zones 19 that provide maximum flexibility to the currency anti-theft pack, including the ability to bend the pack into an "S" shape (such as is illustrated in FIG. 3, although more extreme bending into an S shape is typically possible) without damage to internal components. Referring now to FIG. 2, an exemplary tracking and location assembly embodiment may comprise four modules identified as follows: a wireless communications antenna module 11; a wireless communications electronics module 12; a power module 13; and a GPS electronics/antenna module 14. In one embodiment, the wireless communications antenna and wireless communications electronics modules are GSM (Global System for Mobile Communications, or Groupe Spécial Mobile) compatible. While GSM is a popular standard for mobile phones that is currently widespread and well known in the art, the communications antenna and electronics are not limited to any particular wireless communications or cellular phone technology. Components compatable with any technology capable of providing communications for the purposes described herein, are acceptable, including but not limited to RF transmitters or transceivers. Similarly, although GPS electronics and antenna systems in current use conform to a certain technology, the term "GPS" is not intended to be limited to any particular technology for global positioning, and should be read to encompass any technology capable of providing geographic location information sufficient for tracking and location. Furthermore, the functional cooperation between the wireless communications technology and GPS technology to provide location information to a user trying the track the device may be coordinated by any controller known in the art and may utilize any technology known in the art, including but not limited to the technologies described in the references cited herein above and incorporated by reference. The power module may comprise a printed circuit board (PCB), but is not limited to any particular construction.

Figure 4:
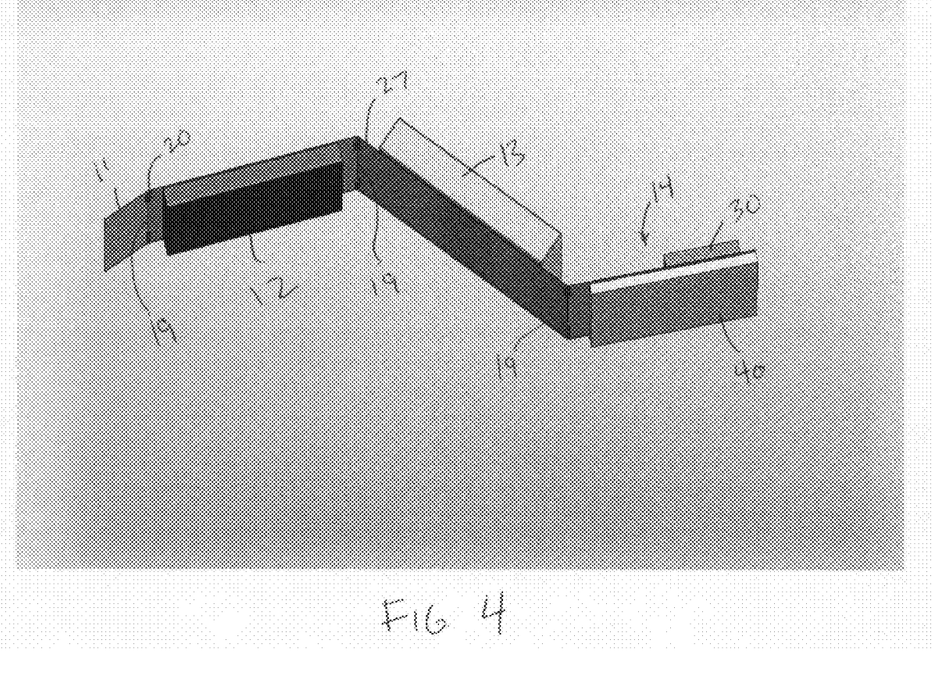
FIG. 4 is perspective side view of another exemplary location tracking assembly.

The modules are interconnected by a flexible interconnect 19, such as but not limited to, individual wiring, ribbon cable, or flexible PCB material with printed conductors. In one configuration, shown in FIG. 4, the tracking device may comprise a continuous substrate 27, which itself may be relatively flexible, in which the flexible interconnects 19 comprise relatively more flexible portions of the continuous substrate. The relatively more flexible portions may contain scores or notches 20 as shown in FIG. 4 to increase flexibility and to allow 'twisting' of the electronic sections relative to each other and/or may comprise a portion of the substrate with relatively reduced thickness as compared to the rest of the substrate, to create living hinges or flexure bearings that increase the flexing and particularly torsional twisting ability of the currency anti-theft pack. A combination of notches and reduced substrate thickness may be used in a continuous substrate embodiment, or any other means for supplying the requisite flexibility. Notches 20 may also be provided in the flexible interconnects 19 used to connect separate substrates on which the modules are positioned, as shown in FIG. 2.

Stabilization tabs 21 extending from the hollowed cutout into the space between adjacent bills in the housing as shown in FIG. 2, may be optionally included on one or more of the modules, or included as part of the flexible interconnect PCB or flexible substrate as applicable. Stabilization tabs 21 allow sliding motion relative to the length of the currency pack and help retain the location tracking assembly within the currency pack without restricting the flexibility of the currency anti-theft pack.

In the embodiment shown in the figures, the wireless communications antenna module 11 is configured for insertion between individual currency bills of housing 5. This configuration allows additional room for the other modules within the hollowed cutout of the housing 5. The wireless communications antenna module also serves as a stabilization tab to secure the location tracking assembly 10 within housing 5. Thus, in at least one embodiment, only a portion of the tracking assembly is housed within the medial cutout in the housing, because at least the wireless communications antenna module is positioned outside of the cutout, between the currency bills. For added flexibility, the wireless communications antenna module may comprise a flexible substrate such as for example, fiberglass, KAPTON® polyamide film, or other similar materials.

In one embodiment, a battery assembly comprising a battery 15, such as but not limited to a flat lithium ion or metal hydride battery known in the art, connected to a flat flexible battery interconnect cable 17, such as a printed conductor, is configured to provide a simple and reliable electrical connection while allowing convenient insertion and replacement. As shown in FIG. 2, the battery 15, slides into a thin metal housing 16 mounted flat on power module 13. Battery interconnect cable 17 lays flat on the top surface of battery 15 when installed, thereby protecting the cable from damage when the currency anti-theft pack is flexed, as well as inhibiting electrical interference with other internal components. The flat flexible printed interconnect cable 17 is connected to power module 13 via battery connection port 18, which comprises, for example, a multi-contact connector.

Typical stacks of currency have a rectangular shape with a longitudinal axis L and a transverse axis T, and when flexed, are typically flexed into a U- or S-shape about the transverse axis. The power module may ideally be designed such that flexing of the device does not cause strain on the connection between battery connection port 18 and flat interconnect 17, which could otherwise cause a failure in the connection. One way such failures can be minimized is by having at least a portion of the flat interconnect 17 run along the transverse axis of the security pack. Thus, as shown in FIG. 2, battery interconnect 17 connects to the battery on one edge of the battery located along a transverse axis of the device and attaches to the battery connection port 18 adjacent to an edge of the battery located along a longitudinal axis of the device. This results in the interconnect cable having a relatively substantial length along the transverse axis. Furthermore, battery connection port 18 is located on the same module as the battery. Thus, when the unit is flexed along the transverse axis, there is minimal, if any, strain on the connections among the battery 15, the battery interconnect 17, and the battery connection port 18. Even if the battery connection port 18 were located on a separate module from the batter interconnect 17, the length of the transverse run of the battery interconnect may provides substantial slack as compared to a design in which the battery interconnect 17 connects both to the battery 15 and the battery connection port 18 along the longitudinal axis.

Although not limited to any particular design, the design shown in FIG. 2 and described above enables the use of standard off-the-shelf connectors and interconnect cables, without requiring any special retaining devices to prevent inadvertent disconnect. This design, in conjunction with the battery housing 16 allows for easy battery replacement without pack disassembly. Location of the battery in the center module 13 may provide for a more even weight distribution and a "balanced" feel. As with the other components, however, the power assembly is not limited to any particular configuration or set of components, and other configurations may be provided.

FIG. 3 shows a side perspective view of an exemplary tracking and locating assembly. Flexible interconnects 19 allow the location tracking assembly 10 to flex between each of the modules. With three or more modules and at least two flexible interconnects separating adjacent interconnected modules, the location tracking assembly 10 can be bent into an "S" shape as shown.

Each of the modules 11, 12, 13, and 14 may comprise discrete substrates 111, 112, 113, and 114, respectively, such PCB substrates, connected together with flexible interconnects 19, as shown in FIGS. 2 and 3, or the device may comprise a continuous substrate 27, as shown in FIG. 4, which may itself be relatively flexible, such as a substrate of MYLAR® polyester film, KAPTON® polyamide film, or other similar material. In such a configuration, the continuous substrate may contain printed conductors and the flexible interconnects 19 may comprise relatively more flexible portions of the continuous substrate. In either the single substrate or multiple substrate configurations, the modules may all be mounted on the substrate or substrates facing a single direction, yielding a flexible configuration similar to that shown in FIGS. 2 and 3. In either the single substrate or multiple substrate configurations, one or more portions of each of the modules may be mounted above and/or below the substrate on opposing sides, including the configuration shown in FIG. 4 in which the location of the substantial components of the modules alternates above and below the substrate for added flexibility and ability to flex into a more extreme S or mirror-image S shape.

Although the configurations shown and described herein have at least two flexible sections and allow the resulting security anti-theft pack to be bent in an "S" shape, it should be understood that a design with a single flexible section between two modules may provide improvements over the prior art, as such a configuration allows some relative movement of at least two modules relative to one another to create some flexibility. While shown and described with a particular arrangement of modules, it should be understood that the positioning of the modules relative to one another is not necessarily critical, although certain advantages are provided by positioning the wireless communications antenna adjacent to the wireless communications electronics and the GPS antenna adjacent to the GPS electronics. In fact, in one embodiment GPS antenna 40 is located on the opposite side of the substrate from GPS electronics 30 such that no RF cable or interconnecting trace is required, thus improving reliability and minimizing required space. Connection between the GPS antenna and associated electronics can therefore be made using a simple printed circuit via, or a wired pass-through. The drawings provided herein generally show the modules as "black boxes" without the associated detail, because the details of these systems are well known in the art and are not necessary for understanding the advantages of the present invention.

Although no specific mention is made herein of the details of the control electronics for coordinating the functions of the system, such control electronics are well known in the art, and may be positioned on the power module, or portions thereof may be spread across one or more of the other modules. Finally, while the term "module" is used for referring to discrete functional units of the present invention, it should be understood that certain functional units may be combined into a single physical unit, such as, for example, the GPS antenna and the GPS electronics, or the functional units may be physically discrete but co-located on a single substrate or substrate portion, such as is shown in FIGS. 3 and 4, which depict the GPS electronics module 30 located on one side of the substrate or substrate portion, while the GPS antenna module 40 is located on the opposite side of the same substrate or substrate portion. Thus, while the invention is depicted in the figures with physically discrete modules, it is well within the scope of this invention for one or more modules to be physically combined or for a single module to be physically split into two or more sections. For example, one embodiment may comprise one or more modules located on one substrate or substrate portion, and the remaining module or modules located on another substrate or substrate portion, with one or more flexible interconnections between the two substrates or substrate portions. In another embodiment, one module may have one or more components physically located on one substrate or substrate portion and one or more components located on another substrate or substrate portion, with flexible interconnects between portions of the module. What is important is that at least one module is separated from at least one other module, or at least one substrate or substrate portion is separated from at least one other substrate or substrate portion, by one or more flexible interconnects. Thus, embodiments having two, three, four, or even five or more substrates or substrate portions connected by flexible interconnects may be devised.

The embodiment shown and described above may be used for tracking and location of stolen currency much in the same way that traditional dye packs are used. The flexible security device described above is typically positioned between two sheets of genuine currency and may be further bound with a standard money strap, and put in a known location within the institution. When a thief requests that the institution hand over genuine currency, the institution causes the stack containing the flexible security device to be taken along with the genuine currency stacks desired to be tracked. The location tracking assembly is activated by any means known in the art. For example, some systems may use a special plate on which the security device sits until its use, and once separated from the plate as detected by electronics in the security device, the device may be activated after a predetermined amount of time as computed by a integral timer. Other systems may use a field surrounding the door to the institution, which activates the device once it passes through the door. The invention is not limited to any particular means for activation. In fact, unlike dye packs, which are typically programmed not to activate inside the bank, where an armed and dangerous robber might harm the institution's patrons if he realizes his robbery has been foiled, the tracking and location information may advantageously be activated immediately. Instant activation may allow the tracking authorities to tell if the robber is still within the building, and potentially determine his or her route for escape from the building.

Once activated, the location tracking assembly retrieves global positioning system coordinates of the device and establishes wireless communications between the device and a receiver for the wireless communications. The coordinates of the device are then transmitted to the receiver via wireless communications. The transmissions may be continuous or periodic, depending on whatever protocol is programmed into the device to meet the user's needs.

Flexible security devices within the scope of this invention are not limited only for use in currency, and may be used for tracking any object, for which there may be an advantage to having a flexible tracking and location assembly. Methods of using such devices include providing the device and causing it to be taken along with the object intended to be tracked. The device is activated to retrieve global positioning system coordinates of the device and to establish wireless communications between the device and a receiver for the wireless communications as discussed above. The device transmits coordinates of the device via the wireless communications to the receiver to allow tracking and location of the object to be tracked.

As noted above, although specific modules are discussed herein and shown located on physically discrete substrates or substrate sections separated by flexible interconnections, it should be understood that designs may be provided in which components of one or more of the modules may be spread across multiple substrates or substrate sections. Such a device may comprise a plurality of substrate sections separated by flexible interconnections, in which the device as a whole comprises all of the aforementioned functionality. While the embodiments described herein fall within the scope of such a description, additional configurations may also fall within that scope. The location tracking assembly of such a device may be characterized as comprising a plurality of substrates or substrate portions separated by interconnects between each set of adjacent substrates or substrate portions, one or more of the interconnects comprising flexible interconnects having sufficient flexibility to permit relative movement of at least one substrate or substrate portion relative to an adjacent interconnected substrate or substrate portion.

In such an embodiment, the location tracking assembly comprises wireless communications means for conducting wireless communications between the assembly and a wireless communications receiver; positioning means for retrieving geographic location information about the device; power means for powering the wireless communications means and the positioning means; and control means for controlling the wireless communications means and the positioning means to transmit geographic location information about the device by wireless communications to the wireless communications receiver. The wireless communications means may comprises any wireless communications technology known in the art and its equivalents, and the positioning means may comprise any GPS technology or other technology known for providing geographic information about the location of a device. The control means may comprise any combination of hardware and software known in the art capable of being programmed with instructions for processing and performing those instructions, such as a computer processing unit (CPU). The control means may have pre-programmed instructions, or may be reprogrammable to allow providing specific instructions to suit a specific user's needs. The power source may be a battery or any equivalent source capable of generating electricity for powering electronic components.

Thus, a number of embodiments disclosed herein provide an improved currency anti-theft pack ideal for tracking, locating and recovering stolen currency, because of visual similarity to an actual currency pack, extreme flexibility, and handling very nearly like a real stack of currency, including a realistic feel and the ability to "riffle" the currency. The embodiments described herein further maximize the space available within the currency pack to house the tracking and locating devices, in particular the wireless communication antennas and the associated electronics and power sources such as batteries, without degrading the overall flexibility and realism of the currency pack. This assembly as described herein also provides an easy and reliable configuration for accessing components of the currency anti-theft pack for repair, maintenance and reconfiguration to various tracking modes.

Although specific embodiments are described herein, the present invention is not intended to be limited to the details described. Numerous modifications can be made to the details of the design without departing from the scope of the invention. Such modifications may include, but are not limited to, variations such as modifying the size of the hollowed cutout; alternating materials, sizes, and shapes of cover sheets and cushioning elements; providing multiple cover sheets or cushioning elements, providing alternate lacing or banding configurations, such as using plastic ties or straps, or rubber bands; using alternate materials for the flexible interconnects; incorporating alternate tracking and locating components, such as "beacon" or other "homing" devices; and/or incorporating additional means to deter theft, such as dye, ink, smoke, teargas, audible alarms, etc., as are known in the art. Accordingly, it is intended that the appended claims cover all such variations as fall within the spirit and scope of the claims.

What is claimed is:

1. A flexible security device for tracking and location, the device comprising:
    a flexible housing having a hollow medial region;
        a location tracking assembly housed, at least in part, within the hollow medial region, the location tracking assembly comprising a plurality of modules, including:
        a wireless communications antenna module;
        a wireless communications electronics module;
        a global positioning system antenna module;
        a global positioning system electronics module;
        a power module; and
        a plurality of substrate portions, each module located at least in part on one or more of the substrate portions, and each pair of adjacent substrate portions separated by one of (a) a complete break between the substrate portions, (b) one or more notches in a continuous substrate, (c) a portion of relatively lesser thickness than adjacent portions of a continuous substrate, or (d) a combination of (b) and (c);
        a plurality of interconnects configured among said plurality of modules, one or more of said interconnects comprising a flexible interconnect between a pair of adjacent substrate portions having sufficient flexibility to permit relative movement of at least one substrate portion relative to an adjacent substrate portion.

2. The flexible security device according to claim 1, wherein said one or more flexible interconnects is selected from the group consisting of individual wires, ribbon cable, and printed conductors.

3. The flexible security device of claim 1, wherein the housing is configured to simulate a stack of bills of currency, the stack comprising a plurality of individual sheets bound together.

4. The flexible security device according to claim 3, wherein said wireless communications antenna module comprises a flat periphery positioned between individual bills of said housing.

5. The flexible security device according to claim 3, wherein each of the individual sheets of said housing has an outer edge said individual sheets bound together with a cord adjacent but sufficiently spaced from the outer edges to permit riffling of the outer edges of said individual sheets at opposite ends of said housing.

6. The flexible security device according to claim 3 comprising at least three substrate portions and two flexible interconnects, each flexible interconnect positioned between two adjacent substrate portions.

7. The flexible security device according to claim 6, wherein the flexible security device is configured to allow bending into an "S" shape.

8. The flexible security device according to claim 3 comprising at least four substrate portions and three flexible interconnects, each flexible interconnect positioned between two adjacent substrate portions.

9. The flexible security device according to claim 3, wherein the location tracking assembly comprises one or more stabilization tabs that extend beyond the hollowed cutout and between adjacent sheets in the housing.

10. The flexible security device according to claim 3 further comprising a first flexible sheet positioned adjacent a top side of said housing as a top cover for the hollowed medial region;
    a second flexible sheet positioned adjacent a bottom side of said housing as a bottom cover for the hollowed cutout, the top cover and the bottom cover each secured to said housing,
    at least one cushioning element between the top cover and the location tracking assembly, and at least one cushioning element between said location tracking assembly and the bottom cover, each cushioning element having at least one face with a smooth surface abutting the location tracking assembly.

11. The flexible security device according to claim 3, wherein said individual sheets of said housing comprise genuine currency.

12. The flexible security device according to claim 1, wherein said power module comprises a battery assembly inserted within a battery housing, the battery assembly comprising a battery and a flat, flexible battery interconnect cable attached thereto, the battery interconnect cable positioned to lie flat over the battery assembly, and a battery connection port for connection of the battery interconnect cable to the power module.

13. The flexible security device according to claim 12, wherein the housing has a longitudinal axis and a transverse axis, and the battery interconnect cable has a length along the transverse axis.

14. The flexible security device according to claim 12, wherein the power module comprises a substrate or substrate portion and the battery assembly is located on the same substrate or substrate portion as the battery connection port.

15. The flexible security device according to claim 1, wherein the power module comprising the battery assembly is positioned centrally in the location tracking assembly.

16. The flexible security device according to claim 1, wherein the wireless communications antenna module comprises a flexible substrate.

17. The flexible security device according to claim 1, wherein the GPS antenna module comprises a substrate portion having a first face and a second face, wherein the GPS antenna is located on the first face of the substrate portion and the GPS electronics module is located on the second face of the same substrate portion.

18. The flexible security device according to claim 1, wherein the location tracking assembly comprises a continuous substrate on which each of the modules is mounted, wherein each of the flexible interconnects comprises printed conductors in a flexible portion of the continuous substrate.

19. The flexible security device according to claim 18, wherein said continuous flexible substrate comprises polyester or polyamide.

20. The flexible security device according to claim 1, wherein one or more of the plurality of interconnects comprises printed conductors, wherein at least one of the printed conductors comprises one or more notches therein to enhance flexibility.

21. A method for tracking and location, the method comprising the steps of:
 a) providing the flexible security device of claim 1;
 b) causing the device to be taken along with one or more objects desired to be tracked;
 c) activating said device to retrieve global positioning system coordinates of said device and to establish wireless communications between the device and a receiver for said wireless communications; and
 d) transmitting the coordinates of the device to the receiver via wireless communications.

22. A flexible security device for tracking and locating currency, the device comprising:
 a housing simulating a stack of bills of currency, the stack comprising a plurality of individual sheets of genuine currency having an outer edge, said individual sheets bound together with an elastic cord adjacent to but sufficiently spaced from the outer edges to permit riffling of the outer edges at opposite ends of said housing, the stack comprising a hollow medial region;
 a location tracking assembly positioned, at least in part, within the hollow medial region, the location tracking assembly comprising a plurality of modules including:
  a wireless communications antenna module comprising a flat periphery that extends beyond said cutout into a space between individual bills of said housing;
  a wireless communications electronics module;
  a global positioning system antenna module;
  a global positioning system electronics module;
  a power module; and
  a plurality of substrate portions, each module located at least in part on one or more of the substrate portions, and each pair of adjacent substrate portions separated by one of (a) a complete break between the substrate portions, (b) one or more notches in a continuous substrate, (c) a portion of relatively lesser thickness than adjacent portions of a continuous substrate, or (d) a combination (b) and (c);
  a plurality of interconnects configured among said plurality of modules, at least two of said interconnects comprising flexible interconnects between adjacent substrate portions and having sufficient flexibility to permit relative movement of the adjacent interconnected substrate portions relative to one another, permitting said tracking assembly to be flexed into an S shape;
 a first flexible sheet positioned adjacent a top side of said housing as a top cover for the hollowed cutout;
 a second flexible sheet positioned adjacent a bottom side of said housing as a bottom cover for the hollowed cutout, the top cover and the bottom cover each secured to said housing;
 one or more cushioning elements between the top cover and the location tracking assembly;
 one or more cushioning elements between said location tracking assembly and the bottom cover.

23. The device of claim 22, further comprising a first flexible interconnect connected between the wireless communications antenna module and the wireless communications electronics module, a second flexible interconnect connected between the wireless communications electronics module and the power module, and a third flexible interconnect connected between the power module and a GPS substrate portion having opposite faces, the GPS electronics module mounted on one face of the GPS substrate portion and the GPS antenna module mounted on an opposite face of the GPS substrate portion.

24. The device of claim 22, comprising a single continuous substrate on which each of the modules is mounted, wherein each of the flexible interconnects comprises printed conductors in a flexible portion of the continuous substrate.

25. A method for tracking and location of currency, the method comprising the steps of:
 a) providing the flexible security device of claim 3;
 b) positioning the flexible security device between two sheets of genuine currency;
 c) causing the flexible security device to be taken along with other currency desired to be tracked;
 d) activating the location tracking assembly to retrieve global positioning system coordinates of the device and to establish wireless communications between the device and a receiver for said wireless communications, and
 e) transmitting the coordinates of the device to the receiver via wireless communications.

26. A flexible security device for tracking and location, the device comprising:
 a flexible housing having a hollow medial region;
 a location tracking assembly housed, at least in part, within the hollow medial region, the location tracking assembly comprising a plurality of substrate portions, each pair of adjacent substrate portions separated by one of (a) a complete break between the substrate portions, (b) one or more notches in a continuous substrate, (c) a portion of relatively lesser thickness than adjacent portions of a continuous substrate, or (d) a combination of (b) and (c), the location tracking assembly comprising interconnects between each pair of adjacent substrate portions, one or more of said interconnects comprising flexible interconnects having sufficient flexibility to permit relative movement of at least one substrate portion relative to an adjacent interconnected substrate portion, the location tracking assembly comprising:
 wireless communications means for conducting wireless communications between the assembly and a wireless communications receiver;
 positioning means for retrieving geographic location information about the device;
 power means for powering said wireless communications means and said positioning means; and
 control means for controlling said wireless communications means and said positioning means to transmit geographic location information about the device by wireless communications to the wireless communications receiver.

\* \* \* \* \*